(12) United States Patent
Mazyar et al.

(10) Patent No.: US 12,448,561 B2
(45) Date of Patent: *Oct. 21, 2025

(54) ENCAPSULATION OF OILFIELD CHEMICALS FOR ON-DEMAND TRIGGERED RELEASE

(71) Applicant: Baker Hughes Oilfield Operations LLC, Houston, TX (US)

(72) Inventors: Oleg Mazyar, Katy, TX (US); Rostyslav Dolog, Houston, TX (US); Radhika Suresh, Sugar Land, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,366

(22) Filed: Aug. 14, 2023

(65) Prior Publication Data

US 2025/0059436 A1    Feb. 20, 2025

(51) Int. Cl.
*E21B 37/06* (2006.01)
*C09K 8/42* (2006.01)
(Continued)

(52) U.S. Cl.
CPC .............. *C09K 8/92* (2013.01); *C09K 8/42* (2013.01); *C09K 8/516* (2013.01); *C09K 8/524* (2013.01);
(Continued)

(58) Field of Classification Search
CPC .. C09K 8/92; C09K 8/42; E21B 37/06; E21B 37/05; E21B 43/34
(Continued)

(56) References Cited

U.S. PATENT DOCUMENTS

| 4,036,301 | A | 7/1977 | Powers et al. |
| 4,269,279 | A | 5/1981 | House |

(Continued)

FOREIGN PATENT DOCUMENTS

| CN | 109517588 A | 3/2019 |
| CN | 110591676 A | 12/2019 |

(Continued)

OTHER PUBLICATIONS

Cabeza et al., "Evaluation of vol. change in phase change materials during their phase transition"; Journal of Energy Storage 28 (2020); Jan. 14, 2020; 4 pages.

(Continued)

*Primary Examiner* — William D Hutton Jr.
*Assistant Examiner* — Ashish K Varma
(74) *Attorney, Agent, or Firm* — CANTOR COLBURN LLP

(57) ABSTRACT

A disintegrable oilfield chemical composite includes a core containing an oilfield chemical and a disintegrating agent containing at least one of a phase change material or a gas-producing material; and a shell encapsulating the core. A method includes introducing into a subsurface formation a treatment fluid including the disintegrable oilfield chemical composite; heating the disintegrating agent to cause the phase change material to expand, or to cause the gas-producing material to produce a gas, or a combination thereof to break the shell; and releasing the oilfield chemical from the disintegrable oilfield composite.

19 Claims, 3 Drawing Sheets

(51) Int. Cl.
*C09K 8/516* (2006.01)
*C09K 8/524* (2006.01)
*C09K 8/528* (2006.01)
*C09K 8/54* (2006.01)
*C09K 8/92* (2006.01)
*E21B 43/34* (2006.01)

(52) U.S. Cl.
CPC ............ *C09K 8/528* (2013.01); *C09K 8/54* (2013.01); *E21B 37/06* (2013.01); *C09K 2208/26* (2013.01); *C09K 2208/32* (2013.01)

(58) Field of Classification Search
USPC ........................................................ 166/376
See application file for complete search history.

(56) References Cited

U.S. PATENT DOCUMENTS

| | | | |
|---|---|---|---|
| 4,391,925 | A | 7/1983 | Mintz et al. |
| 4,614,599 | A | 9/1986 | Walker |
| 4,664,816 | A | 5/1987 | Walker |
| 5,102,559 | A | 4/1992 | McDougall et al. |
| 6,528,157 | B1 * | 3/2003 | Hussain ............... E21B 43/04 428/407 |
| 6,581,701 | B2 | 6/2003 | Heying |
| 7,036,856 | B2 | 5/2006 | Fishencord |
| 7,343,985 | B1 | 3/2008 | Gregg |
| 7,559,369 | B2 | 7/2009 | Roddy et al. |
| 7,629,297 | B2 | 12/2009 | Shaarpour |
| 7,703,521 | B2 | 4/2010 | Sullivan et al. |
| 7,784,542 | B2 | 8/2010 | Roddy et al. |
| 7,784,566 | B2 | 8/2010 | Gregg |
| 7,806,183 | B2 | 10/2010 | Roddy et al. |
| 7,892,352 | B2 | 2/2011 | Roddy et al. |
| 8,574,667 | B2 * | 11/2013 | John ............... E21B 17/1085 427/456 |
| 8,586,512 | B2 | 11/2013 | Roddy et al. |
| 8,592,353 | B2 | 11/2013 | Dalrymple et al. |
| 8,598,093 | B2 | 12/2013 | Roddy et al. |
| 8,603,952 | B2 | 12/2013 | Roddy et al. |
| 8,689,869 | B2 | 4/2014 | Shindgikar et al. |
| 8,815,135 | B2 | 8/2014 | Beecher et al. |
| 9,090,812 | B2 | 7/2015 | Gerrard et al. |
| 9,206,344 | B2 | 12/2015 | Roddy et al. |
| 9,238,771 | B1 | 1/2016 | Mahmoud |
| 9,321,956 | B2 | 4/2016 | Nguyen et al. |
| 9,416,050 | B2 | 8/2016 | Seidl et al. |
| 9,546,315 | B2 | 1/2017 | Pollard et al. |
| 9,587,163 | B2 | 3/2017 | Gaudette et al. |
| 9,702,217 | B2 | 7/2017 | Dolog et al. |
| 9,765,252 | B2 | 9/2017 | Roddy et al. |
| 10,060,205 | B2 | 8/2018 | De Stefano et al. |
| 10,081,756 | B1 | 9/2018 | Reddy et al. |
| 10,160,896 | B2 | 12/2018 | Weaver et al. |
| 10,385,647 | B2 | 8/2019 | Gozalo et al. |
| 10,590,338 | B2 * | 3/2020 | Hall ............... C09K 8/805 |
| 10,718,883 | B2 | 7/2020 | Galliano et al. |
| 11,008,839 | B2 | 5/2021 | Collier et al. |
| 12,258,821 | B2 | 3/2025 | Dolog et al. |
| 12,258,822 | B2 | 3/2025 | Dolog et al. |
| 2008/0087431 | A1 | 4/2008 | Willauer et al. |
| 2009/0084539 | A1 | 4/2009 | Duan et al. |
| 2011/0067872 | A1 | 3/2011 | Agrawal |
| 2011/0088901 | A1 | 4/2011 | Watters et al. |
| 2011/0252781 | A1 | 10/2011 | Johnson et al. |
| 2012/0175118 | A1 | 7/2012 | Khatri et al. |
| 2012/0190593 | A1 * | 7/2012 | Soane ............... B01J 13/206 507/120 |
| 2012/0208726 | A1 | 8/2012 | Smith et al. |
| 2013/0126164 | A1 | 5/2013 | Sweatman et al. |
| 2013/0146312 | A1 | 6/2013 | Gerrard et al. |
| 2014/0262529 | A1 | 9/2014 | Quintero et al. |
| 2014/0345878 | A1 | 11/2014 | Murphree et al. |
| 2015/0060072 | A1 | 3/2015 | Busby et al. |
| 2015/0240609 | A1 | 8/2015 | Lucas et al. |
| 2016/0312098 | A1 | 10/2016 | Savari et al. |
| 2016/0326829 | A1 | 11/2016 | Dolog et al. |
| 2017/0002257 | A1 | 1/2017 | Pisklak et al. |
| 2017/0015824 | A1 | 1/2017 | Gozalo et al. |
| 2018/0037803 | A1 | 2/2018 | Dahi Taleghani et al. |
| 2018/0149008 | A1 | 5/2018 | Nguyen et al. |
| 2018/0237680 | A1 | 8/2018 | Hall et al. |
| 2018/0258340 | A1 | 9/2018 | Rothrock et al. |
| 2019/0031951 | A1 | 1/2019 | Johnson et al. |
| 2019/0375978 | A1 | 12/2019 | Shojaei et al. |
| 2020/0181475 | A1 | 6/2020 | Dighe et al. |
| 2020/0299202 | A1 | 9/2020 | Choi et al. |
| 2020/0354622 | A1 | 11/2020 | Sherman et al. |
| 2020/0362220 | A1 | 11/2020 | Musso et al. |
| 2021/0172303 | A1 | 6/2021 | Musso et al. |
| 2023/0167721 | A1 | 6/2023 | Palisch et al. |
| 2023/0340854 | A1 | 10/2023 | Fripp et al. |
| 2025/0059428 | A1 | 2/2025 | Suresh et al. |
| 2025/0059429 | A1 | 2/2025 | Suresh et al. |
| 2025/0059854 | A1 | 2/2025 | Shepherd et al. |

FOREIGN PATENT DOCUMENTS

| | | |
|---|---|---|
| CN | 111303847 A | 6/2020 |
| KR | 20190036399 A | 4/2019 |
| WO | 03044317 A1 | 5/2003 |
| WO | 2009106796 A1 | 9/2009 |
| WO | 2014092888 A1 | 6/2014 |

OTHER PUBLICATIONS

Da Cunha et al., "Thermal energy storage for low and medium temperature applications using phase change materials—A review"; Applied Energy 177 (2016); May 24, 2016; 12 pages.

Farley et al., "Field Test of a Self-Conforming Oil Recovery Fluid"; Journal of Petroleum Technology; Nov. 1, 1976; 7 pages.

Frampton, et al., "Development of a Novel Waterflood Conformance Control System"; SPE/DOE Symposium, Tulsa OK, Apr. 2004; Paper No. SPE-89391-MS; 7 pages.

Garmeh et al., "Thermally Active Polymer to Improve Sweep Efficiency of Waterfloods: Simulation and Pilot Design Approaches"; SPE Paper No. 144234; Jul. 19, 2011; 13 pages.

Himes, et al., Reversible, Crosslinkable Polymer for Fluid-Loss Control; Society of Petroleum Engineers, SPE Paper No. 27373; Feb. 7, 1994; 2 pages.

International Search Report and Written Opinion for International Application No. PCT/US2024/041891, International Filing Date Aug. 12, 2024, Date of Mailing Nov. 27, 2024, 10 pages.

International Search Report and Written Opinion for International Application No. PCT/US2024/041892, International Filing Date Aug. 12, 2024, Date of Mailing Nov. 22, 2024, 9 pages.

International Search Report and Written Opinion for International Application No. PCT/US2024/041894, International Filing Date Aug. 12, 2024, Date of Mailing Nov. 26, 2024, 12 pages.

Jankowski et al., "A review of phase change materials for vehicle component thermal buffering"; Applied Energy 113 (2014); Oct. 4, 2013; 37 pages.

Kahar et al., "The Versatility of Polymeric Materials as Self-Healing Agents for Various Types of Applications: A Review"; Polymers 2021, 13, 1194; 34 pages.

Kenisarin, "High-temperature phase change materials for thermal energy storage"; Renewable and Sustainable Energy Reviews 14 (2010); Oct. 28, 2009; 16 pages.

Korojy, "Volume Change Effects during Solidification of Alloys"; Royal Institute of Technology; Doctoral Thesis; Jun. 2009; 58 pages.

Li, et al., "Study of solid-solid phase change . . . "; Thermochimica Acta 326 (1999); 4 pages.

Maffeis et al., Application of Thermally Activated Polymers in a Mature Oil Field: Candidates Selection, Field Implementation and Preliminary Results: Offshore Mediterranean Conference; Mar. 2017; 6 pages.

(56) References Cited

OTHER PUBLICATIONS

Magzoub, M. et al. "Loss Circulation Prevention in Geothermal Drilling by Shape Memory Polymer" Elsevier, Geothermics, vol. 89, Jan. 2021, 101943, 7 pages.
Mansour, Ahmed et al., "Smart Expandable LCMs - A Theoretical and Experimental Study;" American Association of Drilling Engineers; Apr. 11, 2017; 7 pages.
Mansour, Ahmed et al., "Smart lost circulation materials for productive zones;" Journal of Petroleum Exploration and Production Technology; May 2, 2018; 16 pages.
Notification of Transmittal of the International Search Report and the Written Opinion of the International Searching Authority, or the Declaration; PCT/US2024/041898; Mail date Nov. 19, 2024; 10 pages.
Peng, et al.; "Phase Change Material (PCM) Microcapsules for Thermal Energy Storage"; Advances in Polymer Technology; vol. 2020, Article ID 9490873; 20 pages; Jan. 12, 2020.
Pereira et al., "Polymers as Encapsulating Agents and Delivery Vehicles of Enzymes"; Polymers 2021, 13, 4061; Nov. 21, 2021; 28 pages.
Rogers et al., "New Equipment Designs Enable Swellable Technology in Cementless Completions"; IADC/SPE Drilling Conference; Mar. 4, 2008.
Savari et al., "Lost Circulation Management in Naturally Fractured Formations: Efficient Operational Strategies and Novel Solutions": IADC/SPE Drilling Conference and Exhibition; Mar. 1, 2016.
Savari et al., "Lost Circulation Management in Naturally Fractured Reservoirs"; SPE/IADC Middle East; Jan. 2016; 6 pages.
Zhong et al., "Mitigation of Lost Circulation in Oil-Based Drilling Fluids Using Oil Absorbent Polymers;" Materials; Oct. 18, 2019; 20 pages.

* cited by examiner

ENCAPSULATION OF OILFIELD CHEMICALS FOR ON-DEMAND TRIGGERED RELEASE

BACKGROUND

The disclosure is directed to disintegrable oilfield chemical composites and the on-demand triggered release of the oilfield chemicals.

Currently chemicals are directly pumped into the target application area and are prone to losses due to adsorption on the surfaces of the pipes, casings and porous formation as well as losses due to unwanted reactions with the components of environment. Thus, methods that can reliably deliver the oilfield chemicals to the desired location will be appreciated in the industry.

SUMMARY

A disintegrable oilfield chemical composite includes: a core containing an oilfield chemical and a disintegrating agent containing at least one of a phase change material or a gas-producing material; and a shell encapsulating the core.

A method includes: introducing into a subsurface formation a treatment fluid including a disintegrable oilfield chemical composite having a core containing an oilfield chemical and a disintegrating agent containing at least one of a phase change material or a gas-producing material, and a shell encapsulating the core; heating the disintegrating agent to cause the phase change material to expand, or to cause the gas-producing material to produce a gas, or a combination thereof to break the shell; and releasing the oilfield chemical from the disintegrable oilfield composite.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
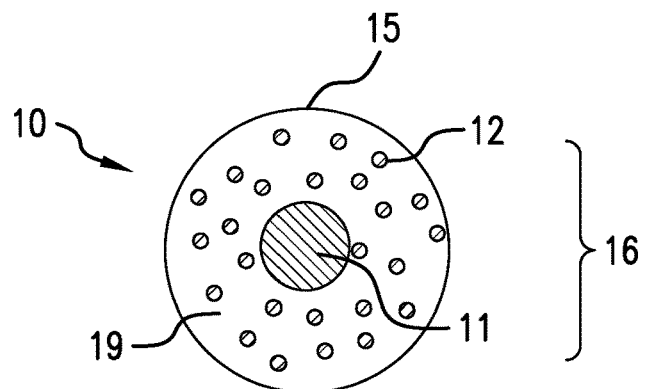
FIG. 1 illustrates a disintegrable oilfield chemical composite comprising a shell, an inner core of an oilfield chemical, and a disintegrating agent disposed in a matrix between the inner core and the shell.

Described are core-shell composites containing a shell protecting an oilfield chemical encapsulated in the shell. The core-shell composites also contain a disintegrating agent capable of exerting pressure on the shell from within the composites when triggered thereby breaking the shell and releasing the oilfield chemical to the desired location.

By using a protective shell, the activity of the oilfield chemical is preserved for the intended application. In addition, loss due to adsorption is prevented. Moreover, the oilfield chemical can be released when needed since the disintegration of the shell can be triggered on demand.

As used herein, oilfield chemicals may include corrosion inhibitors, scale inhibitors, asphaltene and wax inhibitors, wettability altering substances, emulsifiers, demulsifiers, filter cake breakers, lost circulating materials, cement accelerators, or cement retarders. A composite can include more than one oilfield chemical.

The oilfield chemical may be absorbed into a porous structure, and the porous structure with the absorbed oilfield chemical together can be encapsulated by the shell. Examples of the porous structure include zeolites, clays, mesoporous nanoparticles, covalent organic frameworks, metal organic frameworks, porous boron nitride, porous metal oxide nanoparticles, porous carbon based nanoparticles, ceramics, aerogels, etc. The presence of the porous structure can further delay the release of the oilfield chemical once the shell is broken.

The disintegrating agent comprises at least one of a phase change material (PCM) or a gas-producing material. As used herein, a PCM is a substance that can have a volumetric expansion at phase transition. Preferably, the PCMs used in the composites of the disclosure can have a volumetric expansion of at least 3 vol %, at least 5 vol %, or at least 10 vol % during phase transition, each based on the initial volume of the PCMs before expansion or before phase transition. The phase transition temperature of the PCM can be between about 125° F. (52° C.) and about 1000° F. (538° C.), more specifically between about 125° F. (52° C.) and about 700° F. (371° C.). PCMs with transition temperatures between about 500° F. (260° C.) and about 1000° F. (538° C.) can be activated by applying short term localized magnetic heating that would not negatively affect core matrix material and/or encapsulated oilfield chemicals. Furthermore, magnetic materials that provide heating electromagnetic energy can be coated on PCMs to further localize heat inside a composite to regions with PCMs.

The PCMs can be a variety of different material classes, including inorganic materials such as salts, salt hydrates, metal hydroxides, hydrates of metal hydroxides, metallic compounds, and metal alloys; organic materials such as paraffins, fatty acids, esters, alcohols; and eutectic materials such as inorganic-inorganic eutectic materials, inorganic-organic eutectic materials, and organic-organic eutectic materials.

Inorganic salts can be salts of I, II, III, IV groups that are halides, nitrates, carbonates, nitrites, sulfates, or sulfites. Metal hydroxides can be hydroxides of I, II, III, IV group, preferably hydroxides of metals of groups I and II. Preferably, the PCMs are nitrites, halides, or hydroxides of metals of groups I and II and eutectic mixtures of thereof. Some of the inorganic salts can also make eutectic mixtures with organic materials.

Specific examples of the inorganic salts and their eutectic mixtures include $KNO_3$, $KNO_3$—$NaNO_3$, $Li_2CO_3$—

$K_2CO_3$, LiF—NaF—KF—$MgF_2$, LiF—NaF—KF, LiF—KF, $LiKCO_3$, $LiNO_3$, $LiNO_3$—$NaNO_3$, $NaNO_2$, and $NaNO_3$.

Examples of organic PCMs include but are not limited to paraffines such as RT-58, high density polyethylene (HDPE), d-mannitol, hydroquinone, adipic acid, urea, acetamide, erythritol, phthalic anhydride, maleic acid, 2-chlorobenzoic acid, sugars, sugar alcohols, or fatty acids or their derivatives.

Paraffins with chain length of greater than 25 ($C_nH_{2n+2}$, with n>25) can have melting points over 125° F. and typically exhibit volumetric expansion of >10%, usually ~15% or even more and can be a preferred PCM for the disclosed composites. Paraffin with n=100 (Hectane) for example has a melting temperature of 115° C. or 239° F. Accordingly, depending on the specific application and the desired phase transition temperature, a paraffin with a corresponding chain length can be selected.

PCMs with 10-15% volumetric change can include sugars or sugar alcohols. Examples of sugar and sugar alcohol PCMs include glycerol, xylitol, sorbitol, erythritol, glucose, fructose, isomalt, maltitol, lactitol, xylose-D, xylose-L, d-mannitol, and galactitol.

PCMs can also include hydrates of inorganic salts and/or hydrates of metal hydroxides. These materials can break the shell by exerting pressure on the shell in two unique ways. Like other PCMs, hydrates of inorganic salts/metal hydroxides can expand in volume during PCM phase transition. Unlike other PCMs, these hydrates can also release water, which can generate additional pressure on the shell when water transitions to vapor if heated above its boiling point. Examples of the hydrate PCMs include barium hydroxide octahydrate, magnesium nitrate hexahydrate, and magnesium chloride hexahydrate. Other examples may include hydrates of salts of I, II, III, IV groups that are halides, nitrates, carbonates, nitrites, sulfates, sulfites, or eutectic mixtures of thereof.

The disintegrating agent can also include compounds that do not expand during phase transition but can undergo thermal decomposition and produce gas molecules leading to a volume expansion. The gas-producing compound can include at least one of an azo compound, an azide compound, or a metal carbonyl. Azo compounds can release nitrogen upon heating, and can be used as disintegrating agents in the disclosed composites. Examples of azo compounds include azobisisobutyronitrile (AIBN). Organic azide is an organic compound that contains an azide (—$N_3$) functional group. Sodium azide is the inorganic compound with the formula $NaN_3$.

Metal carbonyls are volatile and low-melting compounds of the Mx (CO) y type that decompose on heating into carbon monoxide and metal. Examples of metal carbonyls include $V(CO)_6$, $Cr(CO)_3$, $Mo(CO)_6$, $W(CO)_6$, $Mn_2(CO)_{10}$, $Tc_2(CO)_{10}$, $Fe(CO)_6$, $Os(CO)_5$, $Os_3(CO)_{12}$, $Rh_2(CO)_8$, $[Rh(CO)_3]_x$, $Rh_6(CO)_{15}$, $Ir_2(CO)_8$, $Ni(CO)_4$, and $[Pt(CO)_2]_x$.

The oilfield chemical composites can include about 1 to about 50 wt % or about 5 to about 25 wt % of the oilfield chemical and about 1 to about 25 wt % or about 5 to about 15 wt % of the disintegrating agent, each based on a total weight of the oilfield chemical composites.

The shell of the composites can include natural polymers such as alginate, cellulose, starch, chitosan, dextran sulfate, pectin, or xanthan gum; or synthetic polymers such as polymethacrylate, polydimethylsiloxane, polystyrene, polyvinyl acetate, or polyvinylpyrrolidone. The shell can also include inorganic materials such as silica, alumina, titania, sodium silicate, or calcium carbonate; metallic materials such as nickel, nickel phosphorus or nickel alloys; iron oxides such as magnetite, maghemite, and haematite; oxyhydroxides such as goethite, ferrihydrite, and lepidocrocite; iron salts such as iron carbonates, iron sulfides, and iron carbides; or a combination thereof. The thickness of the shell can be about 5 μm to about 1000 μm or about 10 μm to about 100 μm.

The oilfield chemical can be combined with the disintegrating agent and encapsulated within a solid shell. The geometric arrangements of the oilfield chemical and the disintegrating agent are not particularly limited. The oilfield chemical can form an inner core while the disintegrating agent can form an outer core disposed between the inner core and the shell. Alternatively, the disintegrating agent can form an inner core, and the oilfield chemical can form an outer core disposed between the inner core and the shell. In another aspect, the oilfield chemical and the disintegrating agent can be randomly distributed in a core encapsulated by a shell.

FIG. 1 illustrates a disintegrable oilfield chemical composite (10) comprising a shell (15) encapsulating a core (16), where the core (16) includes an inner core (11) of an oilfield chemical, and a disintegrating agent (12) disposed in a matrix (19) between the inner core (11) and the shell (15).

Figure 2:
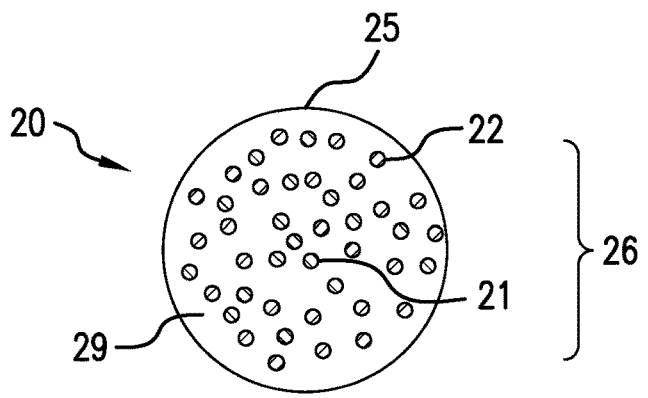
FIG. 2 illustrates a disintegrable oilfield chemical composite comprising an oilfield chemical and a disintegrating agent disposed in a matrix encapsulated in a shell.

FIG. 2 illustrates a disintegrable oilfield chemical composite (20) comprising a shell (25) encapsulating a core (26), where the core (26) includes an oilfield chemical (21) and a disintegrating agent (22) disposed in a matrix (29) encapsulated in the shell (25).

Figure 3:
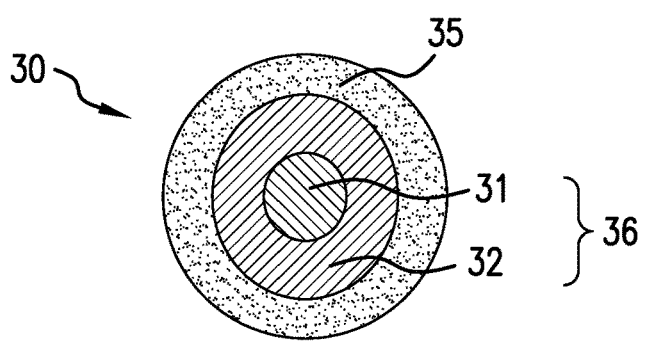
FIG. 3 illustrates a disintegrable oilfield chemical composite comprising a core and a shell encapsulating the core, where the core has an inner core of an oilfield chemical, and an outer core of a disintegrating agent disposed between the inner core and the shell.

FIG. 3 illustrates a disintegrable oilfield chemical composite (30) comprising a core (36) and a shell (35) encapsulating the core (36), where the core (36) has an inner core (31) of an oilfield chemical, and an outer core (32) of a disintegrating agent disposed between the inner core (31) and the shell (35).

As used herein, the matrix is incompressible so that the matrix does not absorb the pressure or force generated by the disintegrating agent upon activation. The matrix can include a matrix material such as organic solvents, water, ionic liquids, crude oils, mineral oils, or a combination comprising at least one of the foregoing.

The composite can further comprise a magnetic material. Suitable magnetic materials can include a paramagnetic material, a superparamagnetic material, or a ferromagnetic material. The magnetic material can be part of the core containing the oilfield chemicals and disintegrating agents. The magnetic material can also be included in the shell of the composites. Illustratively the magnetic material includes but is not limited to iron; nickel; cobalt; ferrite; iron oxides such as magnetite, maghemite, and haematite; oxyhydroxides such as goethite, ferrihydrite, and lepidocrocite; and sulphides such as greigite and pyrrhotite; other iron salts such as iron carbonates, iron sulfides, and iron carbides; or a combination thereof. If present, the disintegrable oilfield chemical composites can comprise about 0.01 to about 5 wt %, about 0.05 to about 0.5 wt %, or about 0.1 to about 0.2 wt % of a magnetic material, each based on a total weight of the disintegrable oilfield chemical composites.

Figure 4:
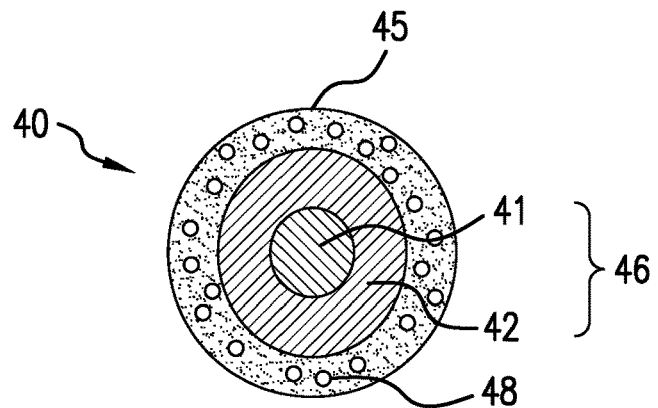
FIG. 4 illustrates a disintegrable oilfield chemical composite comprising a magnetic material disposed in a shell of the disintegrable oilfield chemical composite.

FIG. 4 illustrates a disintegrable oilfield chemical composite (40) comprising a magnetic material (48) included in a shell (45) of the composite. The composite comprises a core (46), which includes an inner core (41) of an oilfield chemical, and an outer core (42) of a disintegrating agent disposed between the inner core (41) and the shell (45).

Figure 5:
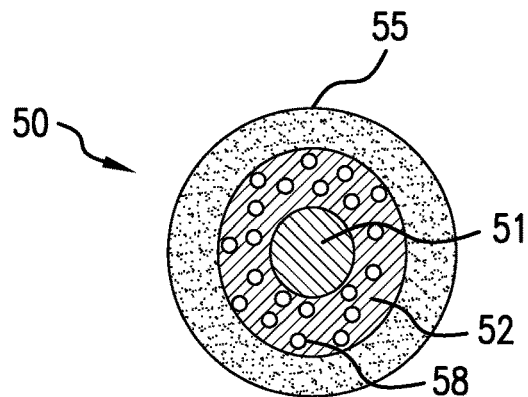
FIG. 5 illustrates a disintegrable oilfield chemical composite comprising a magnetic material disposed in an outer core of a disintegrating agent.

FIG. 5 illustrates a disintegrable oilfield chemical composite (50) comprising a magnetic material (58) disposed in an outer core (52) of a disintegrating agent between an inner core (51) of an oilfield chemical and a shell (55).

Figure 6:
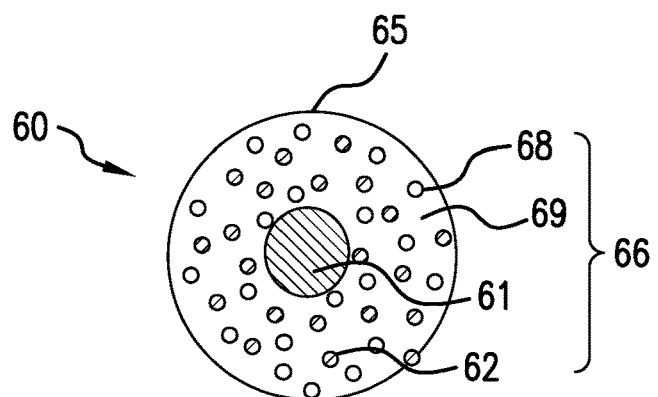
FIG. 6 illustrates a disintegrable oilfield chemical composite comprising a shell, an inner core of an oilfield chemical, and a disintegrating agent and a magnetic material disposed in a matrix between the inner core and the shell.

FIG. 6 illustrates a disintegrable oilfield chemical composite (60) comprising a magnetic material (68) and a disintegrating agent (62) disposed in a matrix (69) between an inner core (61) of an oilfield chemical and a shell (65), which encapsulates the core (66).

Figure 7:
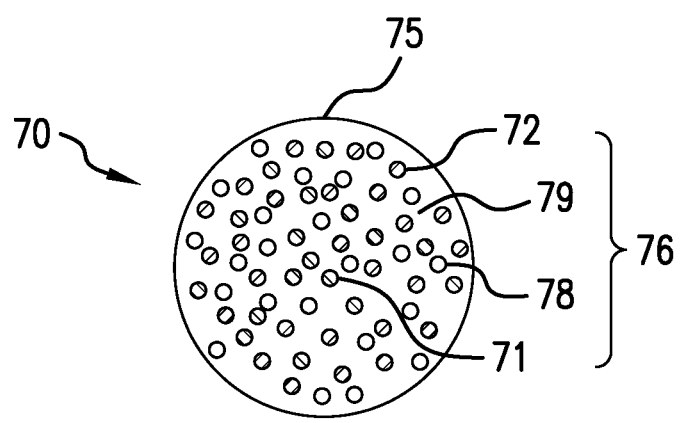
FIG. 7 illustrates a disintegrable oilfield chemical composite comprising a shell encapsulating an oilfield chemical, a disintegrating agent, and a magnetic material disposed in a matrix encapsulated by a shell.

FIG. 7 illustrates a disintegrable oilfield chemical composite (70) comprising a shell (75) encapsulating a core (76) comprising an oilfield chemical (71), a disintegrating agent (72), and a magnetic material (78) disposed in a matrix (79).

The composites can be present in the form of particles, for example particles having a size from about 0.01 to about 5000 μm, specifically about 0.05 to about 1000 μm, and more specifically about 0.1 to about 500 μm. Further, the composite particles can have any shape including spherical, angular, and polyhedral and are monodisperse or polydisperse with an average particle size distribution that is unimodal or multimodal, e.g., bimodal. As used herein the size of the particles refers to D50 particle size. A D50 particle size can be measured using a laser particle size distribution meter. A D50 particle size refers to a particle diameter corresponding to 50% of the particles by number in a cumulative distribution curve in which particles are accumulated in the order of particle diameter from the smallest particle to the largest particle, and a total number of accumulated particles is 100%.

The oilfield chemical composites as described herein can be manufactured via methods such as physical methods, chemical methods, or physical-chemical methods, for example, those methods as described in Advances in Polymer Technology Volume 2020, Article ID 9490873.

In physical methods, the formation of the shell only involves physical processes such as drying, dehydration, and adhesion. Examples of physical methods for encapsulating disintegrating agents and the oilfield chemicals include spray-drying and solvent evaporation. In a spray-drying method, an oil-water emulsion containing the disintegrating agents, the oilfield chemicals, the optional magnetic materials, the optional matrix materials, and the shell materials can be sprayed in a drying chamber by using an atomizer, drying the sprayed droplets through drying gas stream, and separating the solid particles by cyclone and filter. In a solvent evaporation method, the disintegrating agents, the oilfield chemicals, the optional magnetic materials, and the optional matrix materials can be added to a polymer solution containing the shell material dissolved in a volatile solvent to form an emulsion, and the shells can be formed on the droplets by evaporating the solvent. The composites can then be formed through filtration and drying.

Chemical microencapsulation methods utilize polymerization or a condensation process of monomers, oligomers, or prepolymers as raw materials to form shells at an oil-water interface. For example, individual components, e.g., the oilfield chemicals, the disintegrating agents, the optional magnetic materials and the optional matrix materials, and the resin materials (e.g., monomers and/or oligomers used to form a shell) can be combined in a vessel or reactor to form a reaction mixture, and then agitated to mix components. The reaction mixture can be heated at a temperature or at a pressure commensurate with forming the shell.

Hydrolysis and subsequent condensation can also be used to form inorganic shells. For example, alkoxysilanes or metal oxides can undergo hydrolysis then condensation to form a shell of silica, alumina or titania.

The disintegrable oilfield chemical composites can be introduced into the subsurface formation through a treatment fluid during a downhole operation such as a drilling operation, a cementing operation, a completion, a hydraulic fracturing operation, an acidizing treatment, a gravel packing operation, a flooding operation, or a remedial operation.

Introducing the treatment fluid and the performing the downhole operation can occur simultaneously or sequentially. Depending on the specific operation performed, the treatment fluid can be cementing fluids, drilling fluids, fracturing fluids, gravel packing fluids, flooding fluids, acidizing fluids, and the like. In addition to the disintegrable oilfield chemical composites, the treatment fluids can also contain various components known in the art.

The treatment fluid can be injected, e.g., pumped and placed by various conventional pumps and tools to any desired location within a subsurface formation including a wellbore. In an embodiment, injecting the treatment fluid comprises pumping the fluid via a tubular in the wellbore. For example, the treatment fluid can be pumped into an annulus between a tubular and a wall of the wellbore via the tubular.

Once the treatment fluid has been placed in the desired location, the shell can be broken, and the oilfield chemicals can be released from the composites. The method to trigger the release of the oilfield chemicals can include raising the ambient temperature by the subsurface formation and/or by using hot liquid, or steam. When the ambient temperature achieves the phase transition temperature for the phase change material, the phase change material expands exerting pressure on the shell until it breaks thus releasing the oilfield chemical. In the event the disintegrating agent comprises a gas-producing material, the temperature increase can cause the gas-producing material to decompose, producing a gas to break the shell.

The integrity of the shell can also be compromised by ultrasound, chemical degradation, or dissolution in combination with the temperature increase. For the composites that contain a magnetic material, the temperature of the composites can be increased by exposing the magnetic material to a thermomagnetic radiation, for example by inducing Eddy current in it, by magnetic induction heating or via a process known as Neel relaxation through the application of the oscillating electromagnetic field on the composites. The heat produced by the magnetic material can cause the PCMs to expand and/or to cause the gas-producing materials to generate a gas, thus breaking the shell and releasing the oilfield chemicals.

Set forth below are various aspects of the disclosure.

Aspect 1. A disintegrable oilfield chemical composite comprising: a core comprising an oilfield chemical and a disintegrating agent comprising at least one of a phase change material or a gas-producing material; and a shell encapsulating the core.

Aspect 2. The disintegrable oilfield chemical composite as in any prior aspect, wherein the core comprises the phase change material, and the phase change material has a phase transition temperature of about 125° F. (52° C.) and about 1,000° F. (538° C.).

Aspect 3. The disintegrable oilfield chemical composite as in any prior aspect, wherein the phase change material has a volumetric expansion of at least 3% during a phase transition relative to a volume of the phase change material before the phase transition.

Aspect 4. The disintegrable oilfield chemical composite as in any prior aspect, wherein the core comprises the phase change material, and the phase change material comprises at least one of an inorganic salt, an eutectic mixture of inorganic salts, a metal hydroxide, an eutectic mixture of an inorganic salt with an organic material, a hydrate of an inorganic salt, a hydrate of a metal hydroxide, or an organic material.

Aspect 5. The disintegrable oilfield chemical composite as in any prior aspect, wherein the core comprises the gas-producing material, and the gas-producing material comprises at least one of an azo compound, an azide compound, or a metal carbonyl.

Aspect 6. The disintegrable oilfield chemical composite as in any prior aspect, wherein the oilfield chemical comprises at least one of a corrosion inhibitor, a scale inhibitor, an asphaltene or wax inhibitor, a wettability altering substance, an emulsifier, a demulsifier, a filter cake breaker, a lost circulating material, a cement accelerator, or a cement retarder.

Aspect 7. The disintegrable oilfield chemical composite as in any prior aspect, further comprising a porous structure, and the oilfield chemical is absorbed into the porous structure, and the disintegrating agent is not absorbed into the porous structure.

Aspect 8. The disintegrable oilfield chemical composite as in any prior aspect, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

Aspect 9. The disintegrable oilfield chemical composite as in any prior aspect, wherein the core comprises an inner core comprising the oilfield chemical, and the disintegrating agent is disposed between the inner core and the shell.

Aspect 10. The disintegrable oilfield chemical composite as in any prior aspect, wherein the disintegrating agent is disposed in a matrix between the inner core and the shell.

Aspect 11. The disintegrable oilfield chemical composite as in any prior aspect, wherein the disintegrating agent forms an outer core between the inner core and the shell.

Aspect 12. The disintegrable oilfield chemical composite as in any prior aspect, further comprising a magnetic material.

Aspect 13. The disintegrable oilfield chemical composite as in any prior aspect, wherein the magnetic material is disposed in the shell of the disintegrable oilfield chemical composite.

Aspect 14. The disintegrable oilfield chemical composite as in any prior aspect, wherein the electromagnetic material is disposed in the core of the disintegrable oilfield chemical composite.

Aspect 15. The disintegrable oilfield chemical composite as in any prior aspect, wherein the magnetic material is coated on the disintegrating agent.

Aspect 16. The disintegrable oilfield chemical composite as in any prior aspect, wherein the disintegrable oilfield chemical composite is in the form of particles.

Aspect 17. A method comprising: introducing into a subsurface formation a treatment fluid comprising a disintegrable oilfield chemical composite having a core comprising an oilfield chemical and a disintegrating agent comprising at least one of a phase change material or a gas-producing material, and a shell encapsulating the core; heating the disintegrating agent to cause the phase change material to expand, or to cause the gas-producing material to produce a gas, or a combination thereof to break the shell; and releasing the oilfield chemical from the disintegrable oilfield composite.

Aspect 18. The method as in any prior aspect, wherein the disintegrable oilfield chemical composite further comprises a magnetic material.

Aspect 19. The method as in any prior aspect, wherein the method further comprises applying an electromagnetic radiation to the magnetic material to generate heat, and heating the disintegrating agent with the heat generated from the magnetic material.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A disintegrable oilfield chemical composite comprising:
    a core comprising an oilfield chemical and a disintegrating agent comprising at least one of a phase change material or a gas-producing material; and
    a shell encapsulating the core;
    wherein the core comprises the gas-producing material, and the gas-producing material comprises at least one of an azo compound, an azide compound, or a metal carbonyl.

2. The disintegrable oilfield chemical composite of claim 1, wherein the core comprises the phase change material, and the phase change material has a phase transition temperature of about 125° F. (52° C.) and about 1,000 OF (538° C.).

3. The disintegrable oilfield chemical composite of claim 2, wherein the phase change material has a volumetric expansion of at least 3% during a phase transition relative to a volume of the phase change material before the phase transition.

4. The disintegrable oilfield chemical composite of claim 1, wherein the core comprises the phase change material, and the phase change material comprises at least one of an inorganic salt, an eutectic mixture of inorganic salts, a metal hydroxide, an eutectic mixture of an inorganic salt with an organic material, a hydrate of an inorganic salt, a hydrate of metal hydroxide, or an organic material.

5. The disintegrable oilfield chemical composite of claim 1, wherein the core comprises the gas-producing material, and the gas-producing material comprises at least one of an azo compound, an azide compound, or a metal carbonyl.

6. The disintegrable oilfield chemical composite of claim 1, wherein the oilfield chemical comprises at least one of a corrosion inhibitor, a scale inhibitor, an asphaltene or wax inhibitor, a wettability altering substance, an emulsifier, a demulsifier, a filter cake breaker, a lost circulating material, a cement accelerator, or a cement retarder.

7. The disintegrable oilfield chemical composite of claim 1, further comprising a porous structure, the oilfield chemical is absorbed into the porous structure, and the disintegrating agent is not absorbed into the porous structure.

8. The disintegrable oilfield chemical composite of claim 1, wherein the shell comprises at least one of alginate, cellulose, starch, chitosan, dextran sulfate, pectin, xanthan gum, a polymethacrylate, a polydimethylsiloxane, a polystyrene, a polyvinyl acetate, a polyvinylpyrrolidone, silica, alumina, titania, sodium silicate, calcium carbonate, nickel, nickel phosphorus, a nickel alloy, an iron oxide, an oxyhydroxide, or an iron salt.

9. The disintegrable oilfield chemical composite of claim 1, wherein the core comprises an inner core comprising the oilfield chemical, and the disintegrating agent is disposed between the inner core and the shell.

10. The disintegrable oilfield chemical composite of claim 9, wherein the disintegrating agent is disposed in a matrix between the inner core and the shell.

11. The disintegrable oilfield chemical composite of claim 9, wherein the disintegrating agent forms an outer core between the inner core and the shell.

12. The disintegrable oilfield chemical composite of claim 1, further comprising a magnetic material.

13. The disintegrable oilfield chemical composite of claim 12, wherein the magnetic material is disposed in the shell of the disintegrable oilfield chemical composite.

14. The disintegrable oilfield chemical composite of claim 12, wherein the magnetic material is disposed in the core of the disintegrable oilfield chemical composite.

15. The disintegrable oilfield chemical composite of claim 12, wherein the magnetic material is coated on the disintegrating agent.

16. The disintegrable oilfield chemical composite of claim 1, wherein the disintegrable oilfield chemical composite is in the form of particles.

17. A method comprising:
introducing into a subsurface formation a treatment fluid comprising a disintegrable oilfield chemical composite having a core comprising an oilfield chemical and a disintegrating agent comprising at least one of a phase change material or a gas-producing material, and a shell encapsulating the core;
heating the disintegrating agent to cause the phase change material to expand, or to cause the gas-producing material to produce a gas, or a combination thereof to break the shell; and
releasing the oilfield chemical from the disintegrable oilfield composite;
wherein the core comprises the gas-producing material, and the gas producing material comprises at least one of an azo compound, an azide compound, or a metal carbonyl.

18. The method of claim 17, wherein the disintegrable oilfield chemical composite further comprises a magnetic material.

19. The method of claim 18, wherein the method further comprises applying an electromagnetic radiation to the magnetic material to generate heat, and heating the disintegrating agent with the heat generated from the magnetic material.

\* \* \* \* \*